United States Patent [19]
Watanabe et al.

[11] Patent Number: 5,688,534
[45] Date of Patent: Nov. 18, 1997

[54] APPARATUS FOR INTERMITTENTLY EXTRUDING A PREDETERMINED QUANTITY OF FOOD MATERIAL

[75] Inventors: Yukio Watanabe; Michio Morikawa, both of Utsunomiya, Japan

[73] Assignee: Rheon Automatic Machinery Co., Ltd., Utsunomiya, Japan

[21] Appl. No.: 548,995

[22] Filed: Oct. 27, 1995

[30] Foreign Application Priority Data

Oct. 27, 1994 [JP] Japan .................................. 6-263371

[51] Int. Cl.⁶ .................................................. B29C 47/92
[52] U.S. Cl. ........................... 425/145; 425/146; 425/147; 425/238; 426/503
[58] Field of Search .......................... 425/238, 239, 425/145, 146, 147, 558, 149, 574, 166; 426/503, 518, 302; 222/340, 256; 264/349

[56] References Cited

U.S. PATENT DOCUMENTS

| | | | |
|---|---|---|---|
| 615,421 | 12/1898 | Beyer | 425/574 |
| 4,070,142 | 1/1978 | Farrell | 425/166 |
| 4,235,353 | 11/1980 | Capra et al. | 222/256 |
| 4,573,898 | 3/1986 | Jones et al. | 425/145 |
| 4,832,961 | 5/1989 | Aoki | 425/239 |
| 4,876,934 | 10/1989 | Fagan et al. | 83/879 |
| 4,880,371 | 11/1989 | Sinelli et al. | 425/135 |
| 4,904,178 | 2/1990 | Sonoda et al. | 425/574 |
| 4,925,381 | 5/1990 | Aoki et al. | 425/16 |
| 5,043,129 | 8/1991 | Sorensen | 425/574 |

Primary Examiner—Jay H. Woo
Assistant Examiner—Ivrie A. Schwartz
Attorney, Agent, or Firm—Guy W. Bever; Patrick T. Bever

[57] ABSTRACT

An extruding apparatus for intermittently supplying a predetermined quantity of highly viscoelastic material, e.g. food material. The apparatus has a hopper having a supply pump, a supply pipe having one end connected to the pump and the other end to an extrusion valve, and an accumulator (constant pressure device) mounted to the extrusion valve for maintaining the pressure of the food material in the extrusion valve at a predetermined constant pressure.

5 Claims, 7 Drawing Sheets

APPARATUS FOR INTERMITTENTLY EXTRUDING A PREDETERMINED QUANTITY OF FOOD MATERIAL

DETAILED DESCRIPTION OF THE INVENTION

1. Industrial Field of the Invention

The present invention relates to an apparatus to intermittently supply a predetermined quantity of food material of a highly viscoelastic consistency used in the production of various foods.

2. Prior Art

The prior-art technique relating to the present invention is shown in FIG. 8. It shows an apparatus for intermittently supplying food material S. The apparatus comprises a supply pump P and an extrusion valve V, the supply pump P being adapted to supply downstream the food material S contained in a hopper H.

When the food material S is supplied by this apparatus, the material is supplied to a supply pipe T while the extrusion valve V is closed and the supply pump P is stopped when the supply pipe T is filled with the material. When the extrusion valve V opens, the pump P simultaneously begins to rotate to supply under a predetermined pressure the food material S into the supply pipe T. Thus, a predetermined amount of the food material S is intermittently discharged through the exit of the extrusion valve V.

Namely, the food material S is caused to be extruded when the supply pump P begins to rotate and at the same time the extrusion valve V opens. After a predetermined time the supply pump P stops rotating and simultaneously the extrusion valve V closes, thereby a predetermined quantity of the material is discharged.

If the intervals of the opening and closing of the extrusion valve V are not uniform, the food material S supplied to the supply pipe T will flow back into the hopper H through the supply pump P. This brings about a density change in the food material S, and also makes unstable the pressure of the food material S in the supply pipe T. Therefore, this poses a problem in that the following extrusion of the food material S cannot be extruded in a predetermined amount.

SUMMARY

A first object of the present invention is to overcome the following disadvantage of the prior art. Namely, in the prior-art technique of intermittently supplying a predetermined quantity of highly viscoelastic food material, for instance, topping material consisting of a highly viscoelastic biscuit dough used for producing cake bread like melon bread etc., topping material mixed with chocolate chips or raisins, or such other highly viscoelastic food materials as chocolates, jams, custards, etc., kneaded sea urchins and kneaded cheese, the food material was extruded from the exit at unequal intervals, the food material flowed back while the pump was stopped when the food material was extruded, and the pressure in the food material decreased as it was extruded from the extrusion valve and so did the pressure at the lower end of the supply pump. The present invention provides an apparatus for intermittently supplying a predetermined quantity of food material that, by adjusting the extrusion pressure in the extrusion valve, keeps the pressure of the food material always constant, so that a predetermined quantity of food material can be stably extruded.

A second object of the present invention is to provide an apparatus to intermittently supply a predetermined amount of food material that can stably supply topping material consisting of food material over dough bodies consisting of bread dough pieces that are supplied either at equal or unequal intervals.

In accordance with the present invention, an apparatus for intermittently extruding a predetermined quantity of food material onto a conveyor means is provided that comprises a hopper that contains food material having a supply pump at its exit port, a supply pipe having one end connected to the pump and the other end to an extrusion valve, and an accumulator (constant pressure device) mounted on the extrusion valve or located upstream of the extrusion valve, in the direction of the hopper, thereby maintaining the pressure in the food material in the extrusion valve at a constant predetermined pressure.

Further, in accordance with the present invention, an apparatus for intermittently extruding a predetermined quantity of food material onto a conveyor means is provided that comprises a position sensing means located above the conveying means, a hopper to contain the food material located above the conveying means and downstream of the position sensing means, a supply pump located at the exit port of the hopper, a supply pipe one end of said pipe connected to the supply pump and the other end to an extrusion valve, and an accumulator mounted on the extrusion valve or located upstream of the extrusion valve, thereby to keep the pressure in topping material in the extrusion valve constant.

DETAILED DESCRIPTION

Figure 1:
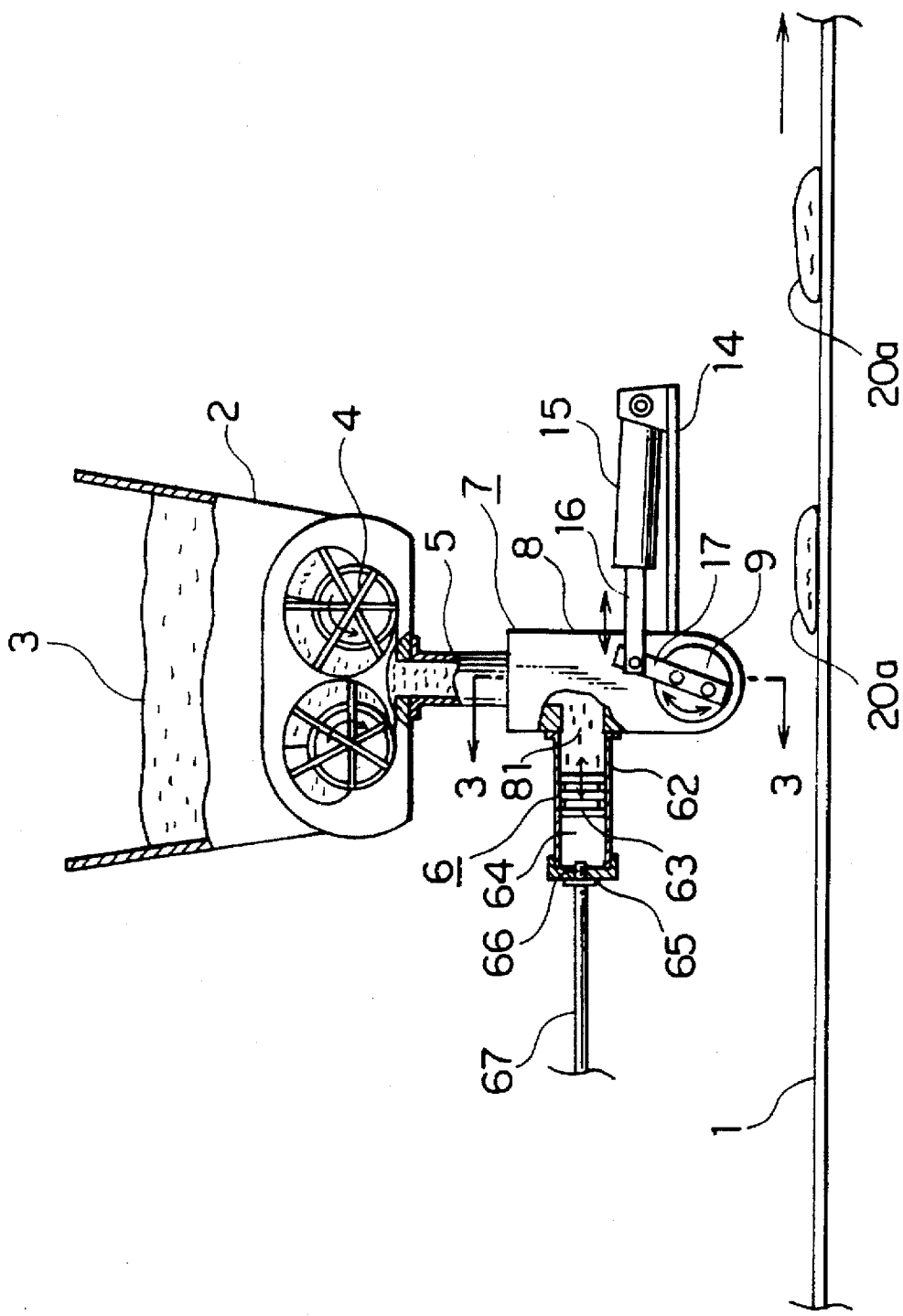
FIG. 1 is a partly cut away front view showing the structure and function of the first embodiment of the present invention.
Figure 6:
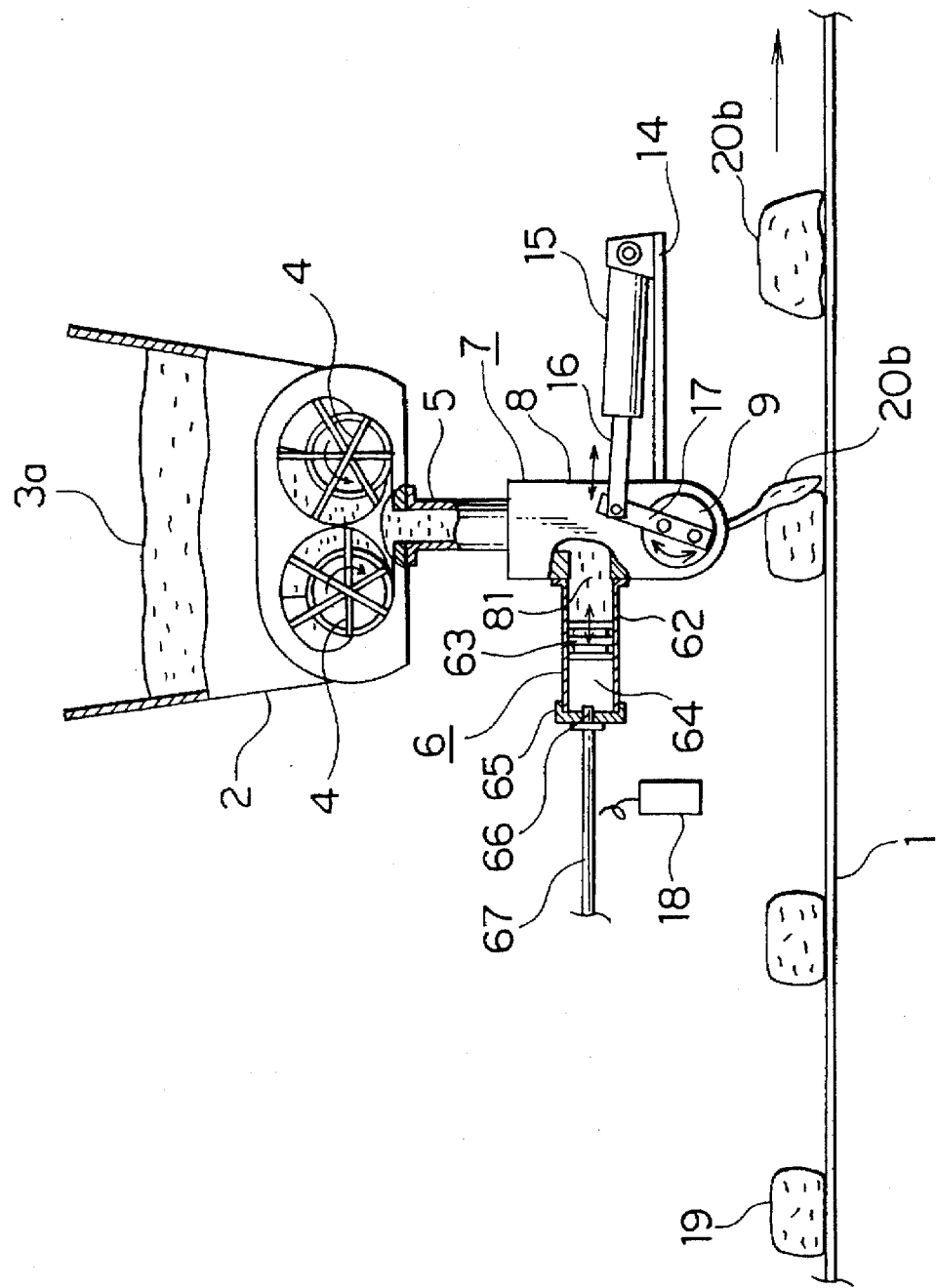
FIG. 6 is a partial cross-sectional front view showing the structure and function of the second embodiment of the present invention.
Figure 7:
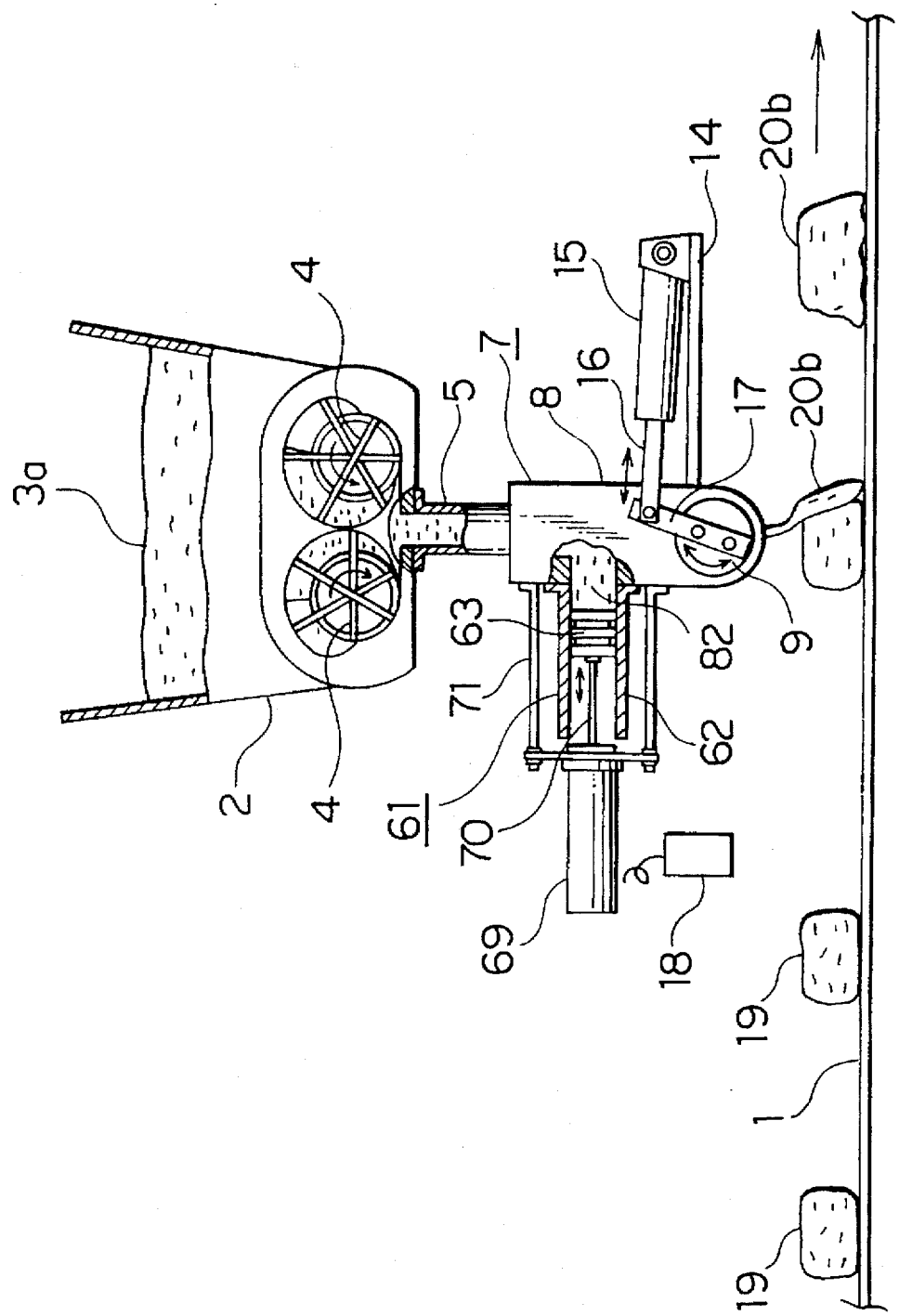
FIG. 7 is a partial cross-sectional front view showing the structure and function of the third embodiment of the present invention.
Figure 8:
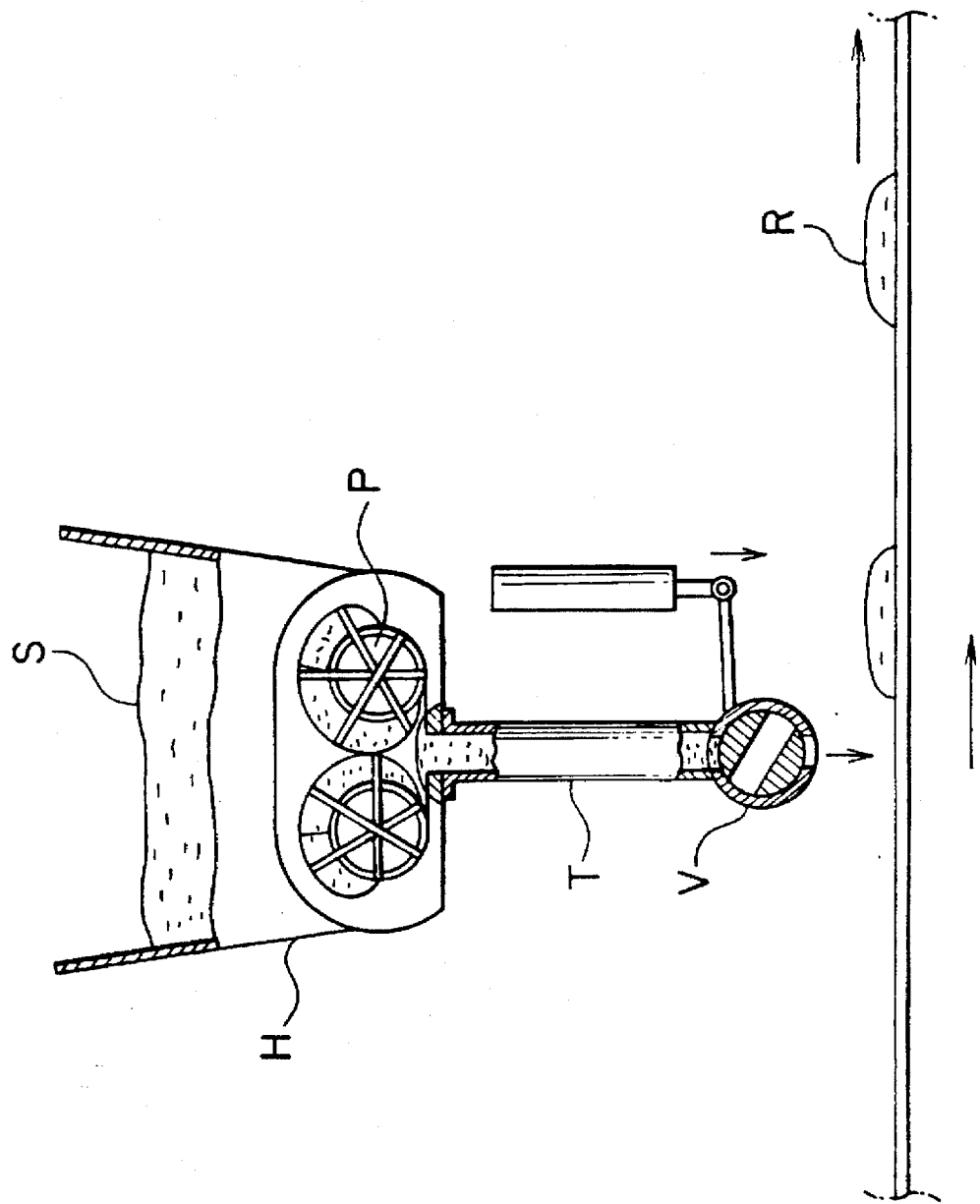
FIG. 8 is a partial cross-sectional front view of a prior-art apparatus.

To realize the above-mentioned first object, as shown in FIGS. 1 and 6, in an embodiment of the present invention a supply pump is provided at the exit port of a hopper and connected to one end of a supply pipe, the other end of the pipe being connected to an extrusion valve. An accumulator (constant pressure means) that keeps the pressure in the supply pipe constant is mounted on the extrusion valve or is located upstream of the extrusion valve on the supply pipe. The accumulator functions to intermittently supply food material onto the upper surface of the conveyor by rotating or stopping the supply pump so that food material can be extruded by keeping the pressure applied to the material at a preset value when the extrusion valve opens and closes. To attain the above-mentioned second object, another embodiment of the present invention has the following structure. As shown in FIG. 6 or 7, a position sensor is located above a conveying means that moves intermittently or at a fixed speed. A supply pump is provided at the exit port of a hopper downstream of the position sensor and above the conveyor means. A supply pipe is provided, one end of which is connected to the supply pump and the other end to an extrusion valve. An accumulator that keeps the pressure in the supply pipe constant is mounted on the extrusion valve or is located upstream of it. The accumulator functions to keep the pressure of the topping material supplied to the extrusion valve constant regardless of whether the supply pump rotates, stops, or the extrusion valve opens or closes.

First Embodiment

Referring to FIGS. 1-5, a first embodiment of the apparatus for intermittently extruding a predetermined quantity of food material will now be explained. The conveying means 1 can be a conveyor that moves at a fixed speed or intermittently. A supply pump 4 is provided in the hopper 2. The supply pump 4 pumps the food material 3 through the exit port of the hopper 2. To the exit port is connected the upper end of a supply pipe 5.

The pump 4 can be, for instance, a volume-type vane pump.

The food material 3 can be, for instance, viscoelastic biscuit dough or the same mixed with chocolate chips or raisins.

An accumulator 6 that pushes the food material 3 in the supply pipe 5 or housing 8 for an extrusion valve 7 at a preset pressure is mounted on the housing inlet 10a or near the exit of the lower end of the supply pipe 5.

One end of an opening of a tubular cylinder 62 of the accumulator 6 is connected to the housing 8 or to the supply pipe 5, so that the food material 3 can freely move into or out of the cylinder 62. In the cylinder 62 a reciprocally movable piston 63 is located. The piston 63 is supported by and can slide on the inner surface of the cylinder 62. The piston 63 and the cylinder 62 form a seal to prevent the food material 3 from proceeding beyond the piston 63. One surface of the piston 63 serves as a contact surface to contact the food material 3.

The piston 63 has a thickness in the axial direction and has at least one annular groove around its periphery to improve fluid-tightness.

The inner diameter of the cylinder 62 is dimensioned so that the food material 3 can freely and smoothly move into or out of the part of the cylinder 62 defined by the contact surface of the piston 63. Also, the inner diameter of the cylinder 62 is sized larger than the diameter of the mouth 81 through which the food material passes into the housing 8 or the cylinder 62. By this arrangement the piston 63 is prevented from projecting from the cylinder 62 into the housing 8 or into the supply pipe 5.

To observe the position of the piston 63, the cylinder 62 is of a tubular construction made of a transparent plastic material or is of a similar construction of any material but formed with a long longitudinal aperture having a certain width, which is covered with a transparent plastic material. Before the food material 3 is extruded, it is supplied to the cylinder 62 to the extent that the piston 63 is pushed back and caused to be located in the middle of the cylinder 62.

A lid 65 is provided at the end of the cylinder 62 opposite to the end where the cylinder 62 is connected to the housing 8.

The lid 65 is formed with an air inlet 66, to which a hose 67 that supplies constant pressure air to the cylinder 62 is removably and air-tightly connected. The supplied pressurized air is fed into the pressure chamber 64 that is defined by the part of the inner wall of the cylinder 62 behind the piston 63, the lid 65, and the rear wall of the piston 63, so that the pressurized air may push the piston 63. The constant-pressure air is supplied to the pressure chamber 64 through the hose 67 from a compressor (not shown) and a pressure adjusting decompressor (not shown), where the constant-pressure air is decompressed to a preset pressure.

The pressure change in the food material 3 in the housing 8 or near the exit of the pipe 5 is supposed to arise from the following reasons:

First, it arises from the change of the volume of the food material 3 in the supply pipe 5 when the material is extruded from the extrusion valve 7.

Second, when the extrusion valve 7 is closed and the supply pump 4 is stopped, the strong viscoelastic characteristics of the food material 3 make it flow back into the hopper 2 through the supply pump 4.

To prevent the pressure change in the food material 3 in the housing 8 as it flows back into the hopper 2, the piston 63 of the accumulator 6 pushes the food material 3 to apply a preset pressure to the material. Conversely, when the pressures of food material 3 becomes higher than the preset value as the supply pump 4 is rotated, the piston 63 is retracted to keep the pressure of the food material constant. Thus the pressure in the food material can be kept constant by the cooperative action of the supply pump 4 and the accumulator 6.

The density change in the food material can also be prevented by the cooperative action of the supply pump 4 and the accumulator 6.

Figure 2:
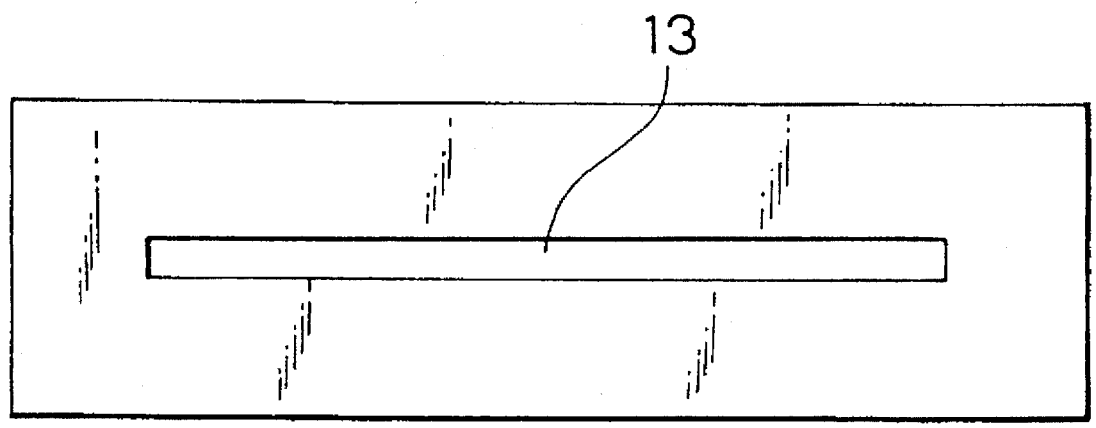
FIG. 2 is a bottom view of the extrusion valve of FIG. 1 partly cut away.
Figure 3:
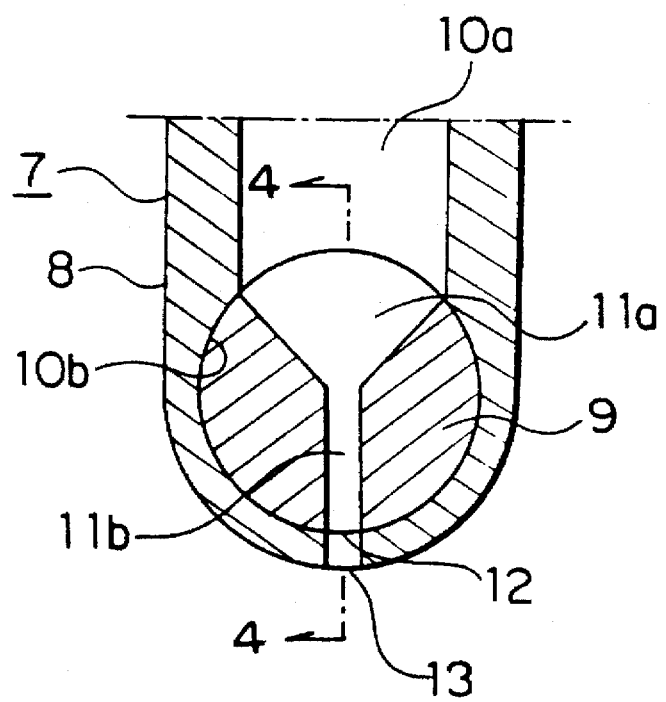
FIG. 3 is a cross-sectional view partly cut away taken along lines 3—3 of FIG. 1.
Figure 4:
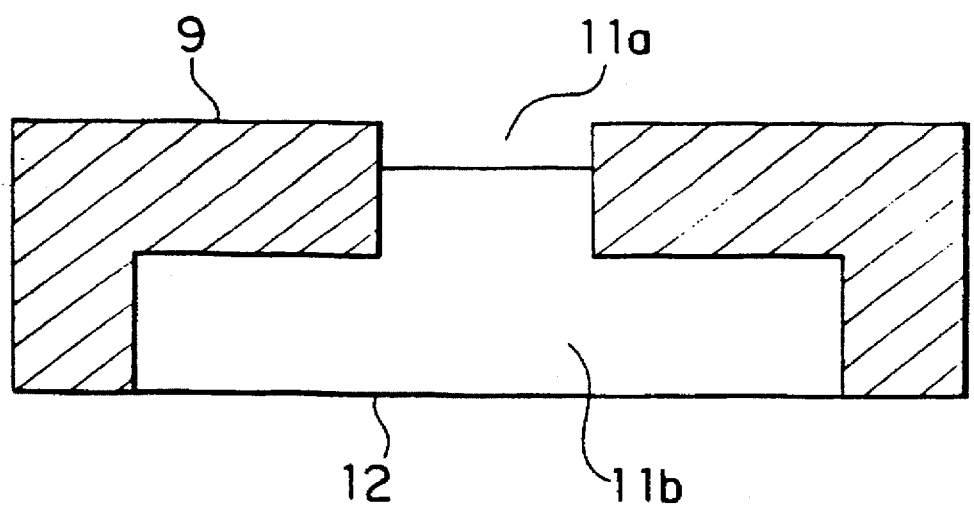
FIG. 4 is a cross-sectional view taken along lines 4—4 of FIG. 3.
Figure 5:
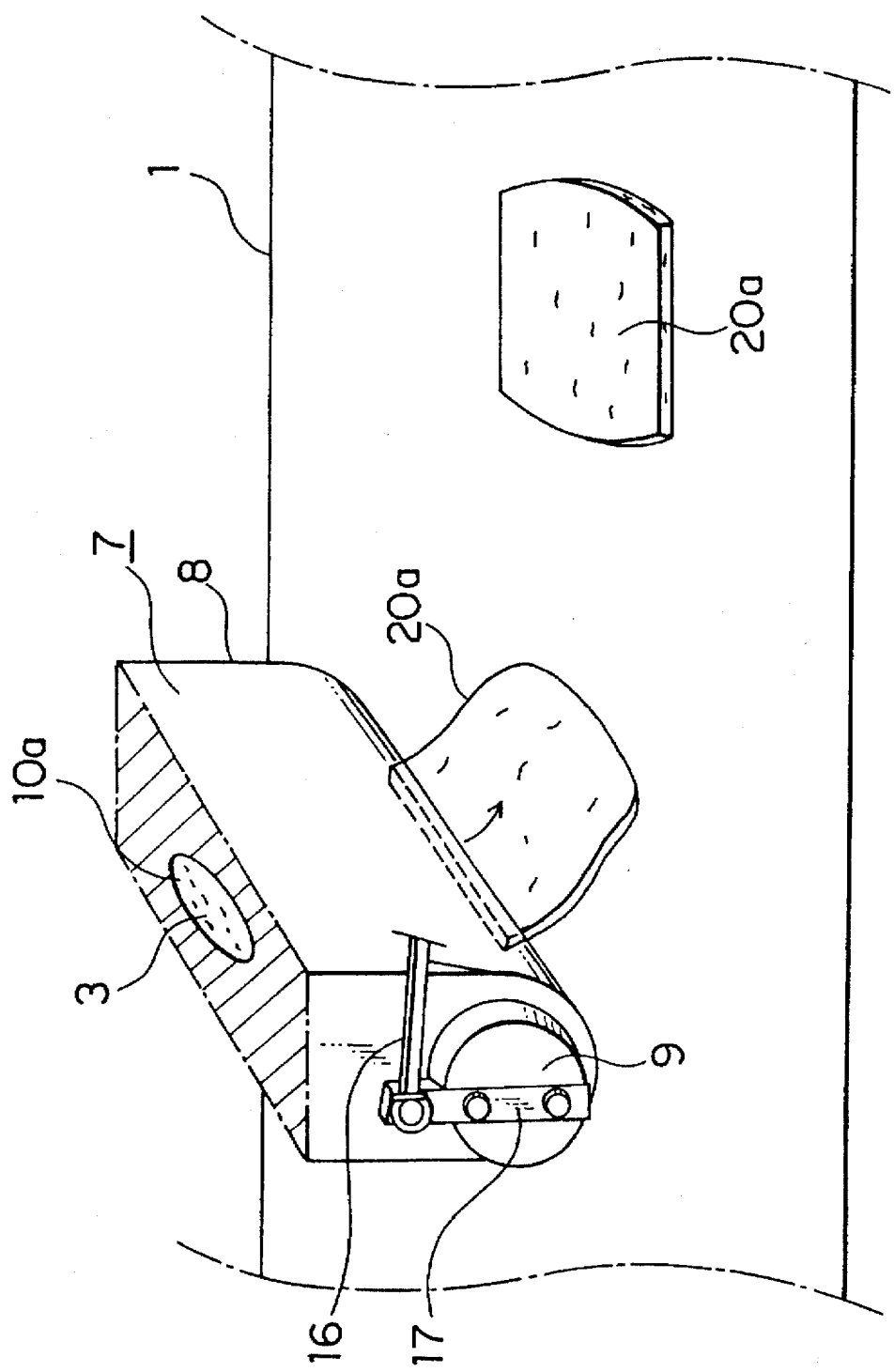
FIG. 5 is a partly cut away explanatory view of the extrusion valve of the first embodiment showing its structure and function.

As shown in FIGS. 2, 3 and 4, the housing 8 for the extrusion valve 7 has a housing inlet 10a, a rotor mounting portion 10b, and a long extrusion aperture 13. The upper end of the inlet 10a is connected to the lower end of the supply pipe 5. A rotor 9 is inserted into the rotor mounting portion 10b of the housing 8 so that the rotor can rotate reciprocally. The rotor 9 is formed with an inlet 11a, a long groove 11b, and a long extrusion aperture 12. When the rotor 9 rotates reciprocally in the rotor mounting portion 10b of the housing 8, the long extrusion aperture 12 located at the end of the long groove 11b and the long extrusion aperture 13 of the housing are made to intermittently conform to each other. The lone extrusion aperture 13 of the housing 8 provided in the extrusion valve 7 and the long extrusion aperture 12 of the rotor are apertures having the same lateral dimensions, and the inner diameter of the housing inlet 10a to receive the food material 3 located at the supply pipe 5 side is generally the same as that of the supply pipe 5.

An air cylinder 15 is pivotally supported on a bracket 14 fixed to the housing 8, and the movable end of the rod 16 of the air cylinder 15 is pivotally connected to one end of an arm 17 connected to the rotor 9. Therefore, when the rod 16 of the air cylinder 15 reciprocates, the rotor 9 in the extrusion valve 7 is rotated. Intermittently extruded dough pieces 20a are deposited onto the conveying means 1 from the long extrusion aperture 13 of the extrusion valve 7.

The first embodiment of the present invention functions as follows:

The food material 3 in the hopper 2 is supplied by the supply pump 4 through the supply pipe 5 to the housing inlet 10a of the supply valve 7. The food material 3 is filled up to the long extrusion aperture 12 through the rotor inlet 11a and the long groove 11b of the rotor 9.

To more precisely set the pressure in the food material 3 at the preset value when it is extruded, the accumulator 6 is connected to the housing 8 of the extrusion valve 7 or located near the lower end of the supply pipe 5 close to the housing 8.

Due to the above-mentioned first or second reason, the pressure in the housing etc. may become lower than the preset value, when the supply pump 4 stops rotating. However, to increase the pressure in the housing 8 etc. to the preset value during the period of time the supply pump 4 is not rotating, the food material 3 in the cylinder 62 is pushed into the housing 8 etc. by the pushing function of the accumulator 6, so that the pressure change can be compensated for.

By rotating the supply pump 4 a predetermined time before or at the moment the extrusion valve 7 opens, the pressure in the food material 3 becomes high, because the food material 3 in the hopper 2 is supplied to the supply pipe 5. The food material 3 the pressure of which has become high in the housing 8 pushes the piston 63 that is subjected to the preset pressure and flows into the cylinder 62. When the pressure of the food material 3 returns to the preset value, the piston 63 stops and becomes subjected to the preset pressure, and then the food material 3 is extruded.

Further, since the supply pump 4 continues to rotate when the extrusion is made and the food material 3 is pushed by the piston 63, the food material 3, when it is extruded, is supplied to the housing 8 etc. from the supply pump 4 and the accumulator 6, thereby the pressure in the housing 8 can always be kept approximately constant, enabling a predetermined amount of food material 20a to be extruded.

Since at least one annular groove is formed in the piston 63 on the surface of the piston 63 facing the cylinder 62, even if the food material 3 enters the interface between the piston 63 and the cylinder 62, such food material 3 will be caught by the annular groove. Thus, even if the food material 3 so enters the interface, it does not proceed beyond the annular groove, thereby the sealing in this region can be enhanced. Also, since the area of contact between the piston 63 and the cylinder 62 can be made small, frictional heat and wear can be prevented, so that a smooth reciprocal movement of the piston 63 can be realized.

To observe the position of the piston 63, the cylinder 62 is of a tubular construction made of a transparent plastic material, or of a similar construction of any material but formed with a long longitudinal aperture having a certain width that is sealed by a transparent material. By this arrangement the pressure in the food material 3 can be known. Further, by supplying the food material 3 to the cylinder 62 to the extent that the piston 63 is caused to be located approximately in the middle of the cylinder 62 before the material 3 is extruded, the piston 63 can quickly meet the pressure change when the material 3 is initially extruded.

By adjusting the reciprocal movement of the rod's stroke, the amount of rotation of the rotor 9 can be changed. By adjusting the overlapping relation of the rotor's long extrusion aperture 12 and the housing's long extrusion aperture 13, both apertures having the same lateral dimensions, the space in the direction of the thickness of the food material 3 formed by the long apertures 12, 13 can be adjusted. Thus, the thickness of the food material 3 when it is extruded from the extrusion valve 7 can be adjusted.

Second Embodiment

FIG. 6 shows the second embodiment of the present invention, wherein a position sensor 18, for instance, a photoelectric sensor, is located upstream of the extrusion valve 7 in the direction of movement of the conveyor 1 and above it. The conveyor 1 advances at a preset speed in the direction of the arrow. An extrusion valve 7 for extruding topping food material 3a is provided downstream of the position Sensor 18 and above the dough body 19.

The hopper 2 is provided with a supply pump 4 to discharge the topping material 3a. To the supply pump 4 a supply pipe 5 is connected.

The supply pump 4 can be, for instance, a volume-type vane pump.

The topping material 3a may consist of biscuit dough or biscuit dough mixed with chocolate chips or raisins, or jams, kneaded sea urchins, etc.

The dough bodies 19 are made of highly viscoelastic fermentable bread dough, cakes of pounded fish, meat or boiled fish paste, all divided into pieces of a certain amount. The bodies are intermittently deposited on the conveying means 1 and conveyed successively by it with a certain distance between them.

An accumulator 6 is mounted on the inlet 10a of the housing 8 of the extrusion valve 7 or on the supply pipe 5, near the exit located at the lower end thereof. The accumulator 6 applies a preset pressure to the topping material 3a contained in the supply pipe 5.

One opening of the tubular cylinder 62 of the accumulator 6 is connected to the housing 8 or the supply pipe 5, so that the topping material 3a can freely flow into or out of the cylinder 62. A reciprocally movable piston 63 is housed in the cylinder 62, one surface of it serving as a contact surface to contact the topping material 3a.

The piston 63 has a thickness in the axial direction and has at least one annular groove at its periphery to improve fluid-tightness.

The inner diameter of the cylinder 62 is dimensioned so that the topping material 3a can freely and smoothly flow into or out of the cylinder 62. Also, the inner diameter of the cylinder 62 is sized larger than the diameter of the mouth 81 through which the topping material 3a passes into the housing 8 or the cylinder 62. By this arrangement the piston 63 is prevented from projecting from the cylinder 62 and from extending into the housing 8 or the supply pipe 5.

To observe the position of the piston 63, the cylinder 62 is of a tubular construction made of a transparent plastic material or is of a similar construction of any material but formed with a long longitudinal aperture having a certain width, which is sealed by a transparent plastic material. Before the topping material 3a is extruded, it is supplied to the cylinder 62 to the extent that the piston 63 is caused to be located approximately in the middle of the cylinder 62.

A lid 65 is provided at the end of the cylinder 62 opposite to the one that is connected to the housing 8.

The lid 65 is formed with an air inlet 66, to which a hose 67 that supplies constant-pressure air to the cylinder 62 is removably and air-tightly connected. The supplied pressurized air is contained in the pressure chamber 64 that is defined by the inner wall of the cylinder 62, the lid 65, and the rear wall of the piston 63, so that the pressurized air may push the piston 63. The constant-pressure air is supplied to the pressure chamber 64 through the hose 67 from a compressor (not shown) and a pressure adjusting decompressor (not shown), where the constant-pressure air is decompressed to have a predetermined pressure.

The pressure change in the topping material 3a in the housing 8 or near the exit of the pipe 5 is supposed to arise from the following reasons:

First, it arises from the change of the volume of the topping material 3a in the supply pipe 5 when the material is extruded from the extrusion valve 7.

Second, when the extrusion valve 7 is closed and the supply pump 4 is stopped, the strong viscoelastic characteristics of the topping material 3a make it flow back into the hopper 2 through the supply pump 4.

To prevent the pressure change in the topping material 3a in the housing 8 as it flows back into the hopper 2, the piston 63 of the accumulator 6 pushes the topping material 3a to apply a preset pressure to the material. Conversely, when the pressures of topping material 3a becomes higher than the preset value as the supply pump 4 is rotated, the piston 63 is in retracted to keep the pressure of the topping material constant. Thus the pressure in the topping material can be kept constant by the cooperative action of the supply pump 4 and the accumulator 6.

As shown in FIG. 6, the structure of the extrusion valve 7 is the same as that of the first embodiment shown in FIGS. 2, 3, and 4.

The rod 16 of an air cylinder 15 controls via an arm 17 the reciprocal rotation of the rotor 9, based on the sensing signal from the position sensor 18.

As shown in FIG. 6, one topping material portion 20b is extruded and deposited on each dough body 19, which is conveyed by the conveying means 1.

The second embodiment of the present invention functions as follows:

The conveying conditions of the dough body 19 of bread dough or the like conveyed by the conveying means 1 at equal or unequal intervals are sensed by the position sensor 18. It obtains the location information on the dough body 19 that is conveyed at random. Based on the information signal a timer (not shown) calculates the opening or closing timing of the extrusion valve 7. Thus, each dough body 19 can synchronously receive one extruded topping material portion 20b regardless of whether or not the dough bodies 19 are conveyed at equal intervals.

The topping material 3a in the hopper 2 is supplied to the housing side inlet 10a of the extrusion valve 7 and filled up to the long extrusion aperture 12 of the rotor through the inlet 11a and the long groove 11b of the rotor.

To precisely preset the pressure, the accumulator 6 is mounted on the housing 8 of the extrusion valve 7, or located near the lower end of the supply pipe 5 close to the housing 8.

Due to the above-mentioned first or second reason, the pressure in the housing etc. may become lower than the preset pressure, when the supply pump 4 stops rotating. However, to increase the pressure in the housing 8 etc. to a preset value during a period of time the supply pump 4 stops rotating, the topping material 3a in the cylinder 62 is pushed into the housing 8 etc. by the pushing function of the accumulator 6, so that the pressure change can be compensated for.

When the supply pump 4 begins to rotate a predetermined time before or the moment the extrusion valve 7 opens, the pressure in the topping material 3a becomes high, because the topping material 3a in the hopper 2 is supplied to the supply pipe 5. The topping material 3a the pressure of which has become high in the housing 8 pushes the piston 63 that is subjected to the preset pressure and flows into the cylinder 62. When the pressure of the topping material 3a returns to the preset value, the piston 63 stops, and then the topping material 3a is extruded.

Further, since the supply pump 4 continues to rotate when the extrusion is made and the topping material 3a is pushed by the piston 63, the topping material 3a, when it is extruded, is supplied to the housing 8 etc. from the supply pump 4 and the accumulator 6, thereby the pressure in the housing 8 can always be kept approximately constant, enabling a predetermined amount of the topping material 20b to be extruded.

Since at least one annular groove is formed in the piston 63 on its surface facing the cylinder 62, even if the topping material 3a enters the interface between the piston 63 and the cylinder 62, such topping material 3a will be caught by the annular groove. Thus, even if the topping material 3a so enters interface, it does not proceed beyond the annular groove, thereby this region can be securely sealed. Also, since the area of contact between the piston 63 and the cylinder 62 can be made small, frictional heat and wear can be prevented, so that a smooth reciprocal movement of the piston 63 can be realized.

To observe the position of the piston 63, the cylinder 62 is of a tubular construction made of a transparent plastic material, or of a similar construction of any material but formed with a long longitudinal aperture having a certain width and sealed by a transparent material. By this arrangement the pressure in the topping material 3a can be known. Further, by supplying the topping material 3a to the cylinder 62 to the extent that the piston 63 is caused to be located approximately in the middle of the cylinder 62 before the material 3a is extruded, the piston 63 can quickly meet the pressure change when the material 3a is initially extruded.

By adjusting the reciprocal movement of the rod's stroke, the amount of reciprocal rotation of the rotor 9 of the extrusion valve 7 can be changed. By adjusting the overlapping relation of the rotor's long extrusion aperture 12 and the housing's long extrusion aperture 13, both apertures having the same lateral dimensions, the space in the direction of the thickness of the topping material 3a formed by the long apertures 12, 13 can be adjusted. Thus, the thickness of the topping material 3a when it is extruded from the long extrusion aperture 13 of the housing 8 can be varied, to thereby deposit the topping material 20b having an appropriate thickness onto the upper surface of the dough body 19.

When the topping material 3a is extruded as above, the position sensor 18 located above the conveying means 1 senses the position of the dough body 19 and changes the conveying information to signals. These signals are transmitted to a timer (not shown) that calculates the opening and closing timing of the extrusion valve 7 to timely extrude the topping material 3a. Thus, the upper surface of each of the dough bodies can be stably covered by the topping material portions 20b.

Third Embodiment

FIG. 7 is a partially cross-sectional front view of the third embodiment of the present invention. In this drawing part of the reference numbers is the same as in FIG. 6 and the explanations of them are omitted.

Similarly to the accumulator 6 of the second embodiment, the accumulator 61 of this embodiment is also fixed to the inlet 10a of the housing 8 or located near the exit at the lower end of the supply pipe 5.

One opening of the tubular cylinder 62 of the accumulator 6 is connected to the housing 8 or the supply pipe 5, so that the topping material 3a can freely flow into or out of the cylinder 62. A reciprocally movable piston 63 is housed in the cylinder 62, one surface of it serving as a contact surface to contact the topping material 3a.

The piston 63 has a thickness in the axial direction and has at least one annular groove around its periphery to improve fluid-tightness.

The inner diameter of the cylinder 62 is the same as that of the mouth 82 through which the topping material 3a passes from the housing 8 or from the supply pipe 5 into the cylinder 62.

To observe the position of the piston 63, the cylinder 62 is of a tubular construction made of a transparent plastic material or is of a similar construction of any material but formed with a long longitudinal aperture having a certain width, which is sealed by a transparent plastic material. Before the topping material 3a is extruded, it is supplied to the cylinder 62 to the extent that the piston 63 is caused to be located approximately in the middle of the cylinder 62.

An air cylinder 69 is provided at the end of the cylinder 62 opposite to the end where the cylinder 62 and the housing 8 are connected. The air cylinder 69 is supported by a bracket 71 fixed to the housing 8.

A reciprocally movable rod 70 of the air cylinder 69 is connected at its forward end to the piston's surface that is opposite to the one that contacts the topping material.

Pressurized air supplied from a compressor (not shown) flows through a pressure adjustable decompressor (not shown), where the air is decompressed to a preset pressure. The pressurized air so decompressed is supplied to the air cylinder 69. Thus, a preset pressure is applied to the piston 63 connected to the rod 70 to maintain the piston 63 subjected to this preset pressure.

The third embodiment of the present invention functions as follows: In FIG. 7, the same reference numbers for the same elements as those in FIG. 6 are used.

To more precisely preset the pressure of the topping material 3a when it is extruded, the accumulator 61 is connected to the housing 8 of the extrusion valve 7 or located near the lower end of the supply pipe 5 close to the housing 8.

Due to the above-mentioned first or second reason, the pressure in the housing etc. may become lower than the preset pressure, when the supply pump 4 stops rotating. However, to increase the pressure in the housing 8 etc. to a preset value during the period of time the supply pump 4 is not rotating, the topping material 3a in the cylinder 62 is pushed into the housing 8 etc. by the pushing function of the accumulator 61, so that the pressure change can be compensated for.

By rotating the supply pump 4 a predetermined time before or the moment the extrusion valve 7 opens, the pressure in the topping material 3a becomes high, because the material 3a in the hopper 2 is supplied to the supply pipe 5. The topping material 3a the pressure of which has become high in the housing 8 pushes the piston 63 that is subjected to the preset pressure and flows into the cylinder 62. When the pressure of the topping material 3a returns to the preset value, the piston 63 stops and is subjected to the pressure at the preset value, and then the topping material 3a is extruded.

Further, since the supply pump 4 continues to rotate when the topping material 3a is extruded and the topping material 3a is pushed by the piston 63, the topping material 3a, when it is extruded, is-supplied to the housing 8 etc. from the supply pump 4 and the accumulator 61, thereby the pressure in the housing 8 can always be kept approximately constant, enabling a predetermined amount of topping material 20b to be extruded.

The piston 63 is connected to the forward end of the rod 70 of the fixed air cylinder 69 and is always maintained in the cylinder 62. The inner diameter of the cylinder 62 and the diameter of the housing's path 82 through which the topping material 3a is supplied to the cylinder 62 are of the same size. Thus, the topping material 3a can flow inwardly or outwardly relative to the path 82 without encountering any resistance, so that the pressure can be more precisely adjusted.

Thus in accordance with the present invention, by mounting the accumulator on the housing etc. to always apply a predetermined pressure to the food material or topping material in the extrusion valve etc., a pressure change can be compensated for. Such a pressure change arises when the food material or topping material flows back into the hopper past the supply pump due to the highly viscoelastic characteristics of the material, when the supply pump is stopped. Further, when the supply pump is rotated to extrude the food material or topping material, the pressure in the extrusion valve will quickly become high. However, when the increased pressure exceeds the preset value, the food material or topping material will flow into the accumulator to prevent the rapid increase of the pressure. Therefore, the food material or topping material will not be excessively damaged. By maintaining the extrusion pressure always constant, the food material or topping material can be stably extruded from the extrusion valve.

By providing the position sensor upstream of the extrusion valve relative to the conveyor, the topping material can be deposited on the upper surface of the articles conveyed, for example, dough bodies.

We claim:

1. An apparatus for intermittently extruding predetermined quantities of food material onto a conveying means, the apparatus comprising:

a hopper for containing food material, the hopper including an exit port and a supply pump for pumping the food material through the exit port;

an extrusion valve assembly including a housing connected to receive the food material pumped through the exit port of the hopper; and an accumulator for maintaining the food material located in the extrusion valve at a predetermined pressure by expanding to receive the food material from the housing when a pressure of the food material in the housing becomes greater than the predetermined pressure, and by contracting to push food material into the housing when a pressure of the food material in the housing becomes less than the predetermined pressure.

2. The apparatus according to claim 1, further comprising a supply pipe for having a first end connected to the exit port and a second end connected to the housing such that the food material pumped through the exit port passes through the supply pipe to the housing;

wherein the accumulator comprises a cylinder communicating with the housing and a piston slidably mounted in the cylinder;

wherein when a pressure of the food material in the housing and supply pipe becomes greater than the predetermined pressure, the food material enters the cylinder and presses the piston away from the housing, thereby reducing the pressure of the food material in the housing and supply pipe to the predetermined pressure; and wherein when a pressure of the food material in the housing and supply pipe becomes less than the predetermined pressure, the piston moves toward the housing, thereby forcing the food material into the housing to increase the pressure of the food material in the housing and supply pipe to the predetermined pressure.

3. An apparatus for intermittently extruding predetermined quantities of food material onto food masses conveyed on a conveying means such that one of the predetermined quantities is deposited on each of the conveyed food masses, the apparatus comprising:

a position sensing means located above the conveying means for generating detection signals indicating the presence of one of the food masses;

a hopper for containing food material located above the conveying means and downstream of the position sensing means, the hopper including an exit port and a supply pump for pumping the food material through the exit port;

an extrusion valve assembly including a housing connected to receive the food material pumped through the exit port of the hopper;

an accumulator for maintaining the food material located in the supply pipe and the extrusion valve at a predetermined pressure by expanding to receive food material from the housing when a pressure of the food material in the housing becomes greater than the predetermined pressure, and by contracting to push food material into the housing when a pressure of the food material in the housing becomes less than the predetermined pressure; and means for controlling the extrusion valve and supply pump in response to the detection signals such that the extrusion valve deposits one of the predetermined quantities of food material onto each detected food mass.

4. The apparatus according to claim 3, further comprising a supply pipe for having a first end connected to the exit port and a second end connected to the housing such that the food material pumped through the exit port passes through the supply pipe to the housing;

wherein the accumulator comprises a cylinder communicating with the housing, a piston slidably mounted in the cylinder, and means for biasing the piston toward the housing;

wherein when a pressure of the food material in the housing and supply pipe becomes greater than the predetermined pressure, food material enters the cylinder and presses the piston away from the housing, thereby reducing the pressure of the food material in the housing and supply pipe to the predetermined pressure; and wherein when a pressure of the food material in the housing and supply pipe becomes less than the predetermined pressure, the biasing means causes the piston to move toward the housing, thereby forcing food material into the housing to increase the pressure of the food material in the housing and supply pipe to the predetermined pressure.

5. The apparatus according to claim 4, wherein the cylinder includes a first chamber communicating with the housing, the first chamber being located on a first side of the piston, the cylinder also including a second chamber located on a second side of the piston such that the piston is located between the first chamber and the second chamber, and wherein the accumulator further comprises a constant pressure source connected to the second chamber for supplying constant pressure gas to the second chamber.

* * * * *

UNITED STATES PATENT AND TRADEMARK OFFICE
CERTIFICATE OF CORRECTION

PATENT NO.   : 5,688,534
DATED        : November 18, 1997
INVENTOR(S)  : Yukio Watanabe et al.

It is certified that error appears in the above-indentified patent and that said Letters Patent is hereby corrected as shown below:

On the Title Page

In column 2, line 12, replace "Guy W. Bever" with --Guy W. Shoup--.

Signed and Sealed this

Thirtieth Day of March, 1999

Attest:

Q. TODD DICKINSON

*Attesting Officer*            *Acting Commissioner of Patents and Trademarks*